(12) United States Patent
Lu (10) Patent No.: US 12,244,167 B2
(45) Date of Patent: Mar. 4, 2025

(54) CHARGING APPARATUS AND CHARGING METHOD

(71) Applicant: VIVO MOBILE COMMUNICATION CO., LTD., Guangdong (CN)

(72) Inventor: Shaofeng Lu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 706 days.

(21) Appl. No.: 17/537,411

(22) Filed: Nov. 29, 2021

(65) Prior Publication Data

US 2022/0085616 A1 Mar. 17, 2022

Related U.S. Application Data

(63) Continuation-in-part of application No. PCT/CN2020/079491, filed on Mar. 16, 2020.

(30) Foreign Application Priority Data

May 29, 2019 (CN) .......................... 201910458455.0

(51) Int. Cl.
*H02J 7/00* (2006.01)

(52) U.S. Cl.
CPC .......... *H02J 7/007* (2013.01); *H02J 7/00034* (2020.01); *H02J 7/00036* (2020.01);
(Continued)

(58) Field of Classification Search
CPC ...... H02J 7/007; H02J 7/0031; H02J 7/00036; H02J 7/0029; H02J 7/0036; H02J 7/00034
(Continued)

(56) References Cited

U.S. PATENT DOCUMENTS 5,923,149 A * 7/1999 Umetsu ................ H02J 7/00711
320/141
9,871,390 B2 1/2018 Wu
(Continued)

FOREIGN PATENT DOCUMENTS

CN 103208850 A 7/2013
CN 103312014 A 9/2013
(Continued)

OTHER PUBLICATIONS

First Office Action of Priority Application No. 201910458455.0 mailed on May 28, 2020.
(Continued)

*Primary Examiner* — Edward Tso
*Assistant Examiner* — Aaron Piggush
(74) *Attorney, Agent, or Firm* — IP & T GROUP LLP (57) ABSTRACT

A charging apparatus includes: a first comparison module, a second comparison module, a control module, and a charging module. The first comparison module is configured to compare a first data voltage value with a target preset value when it is detected that the charging apparatus is connected to a device to be charged, and output a first voltage level set according to a comparison result. The second comparison module is configured to compare a second data voltage value with the target preset value when it is detected that the charging apparatus is connected to the device to be charged, and output a second voltage level set according to a comparison result. The control module is configured to control the charging module to charge the device to be charged with a target power according to the first voltage level set and the second voltage level set.

9 Claims, 3 Drawing Sheets

(52) U.S. Cl.
CPC .......... *H02J 7/0031* (2013.01); *H02J 7/0036* (2013.01); *H02J 7/0029* (2013.01)

(58) Field of Classification Search
USPC ................................ 320/134, 162, 107, 108
See application file for complete search history.

(56) References Cited

U.S. PATENT DOCUMENTS

| | | | | |
|---|---|---|---|---|
| 2004/0246031 | A1* | 12/2004 | Lourens | G01K 3/005 327/58 |
| 2013/0241477 | A1* | 9/2013 | Kao | H02J 50/10 320/108 |
| 2014/0266032 | A1* | 9/2014 | Tsai | H02J 7/04 320/108 |
| 2015/0236522 | A1* | 8/2015 | Zhao | H02J 7/00036 320/162 |
| 2016/0190848 | A1* | 6/2016 | Chen | H02J 7/00 320/162 |
| 2016/0308404 | A1* | 10/2016 | Tsai | H02J 7/00034 |
| 2017/0310122 | A1* | 10/2017 | Chang | H02J 7/007 |

FOREIGN PATENT DOCUMENTS

| | | |
|---|---|---|
| CN | 207218342 U | 4/2018 |
| CN | 108988511 A | 12/2018 |
| CN | 110086230 A | 8/2019 |
| WO | 2013057584 A2 | 4/2013 |

OTHER PUBLICATIONS

International Search Report and Written Opinion of International Application No. PCT/CN2020/079491 mailed on Jun. 22, 2020.

* cited by examiner

| A charging apparatus obtains a first voltage level set and a second voltage level set when detecting that the charging apparatus is connected to a device to be charged | — S501 |
|---|---|
| The charging apparatus charges the device to be charged with a target power according to the first voltage level set and the second voltage level set | — S502 |

FIG. 5

CHARGING APPARATUS AND CHARGING METHOD

CROSS-REFERENCE TO RELATED APPLICATIONS

This application is a Bypass Continuation-in-Part Application of PCT/CN2020/079491 filed on Mar. 16, 2020, which claims priority to Chinese Patent Application No. 201910458455.0 filed on May 29, 2019, which are incorporated herein by reference in their entirety.

TECHNICAL FIELD

The embodiments of the present disclosure relate to the field of terminal technologies, and in particular, to a charging apparatus and a charging method.

BACKGROUND

Generally, before charging, a terminal device first performs power detection on a charging apparatus according to the Battery Charging Specification 1.2 (BC1.2) to obtain a power that the charging apparatus can output; then, the terminal device requests the charging apparatus to charge the terminal device with a charging power suitable for the terminal device. For example, a terminal device supporting high-power charging can request, by connecting to a dedicated charger, a charging apparatus to charge with a high power, and can request, by connecting to a USB port of a computer, the charging apparatus to charge with a low power.

However, some terminal devices skip performing power detection before charging, for example, some terminal devices do not support BC1.2. As these terminal devices skip performing power detection on a charging apparatus, the charging apparatus may charge a terminal device that only supports low-power charging with a high power, which overloads the charging circuit of the terminal device, causing damage to the charging circuit of the terminal device or excessive temperature, which leads to safety accidents. For that reason, the current charging method is less safe.

SUMMARY

In a first aspect, an embodiment of the present disclosure provides a charging apparatus, the charging apparatus including: a first comparison module, a second comparison module, a control module connected to the first comparison module and the second comparison module, and a charging module connected to the control module; the first comparison module configured to compare a first data voltage value with a target preset value when it is detected that the charging apparatus is connected to a device to be charged, and output a first voltage level set according to a comparison result; the second comparison module configured to compare a second data voltage value with the foregoing target preset value when it is detected that the charging apparatus is connected to the device to be charged, and output a second voltage level set according to a comparison result; and the control module configured to control the charging module to charge the device to be charged with a target power according to the first voltage level set and the second voltage level set.

In a second aspect, an embodiment of the present disclosure further provides a charging method, the charging method applied to a charging apparatus, and the method including: obtaining a first voltage level set and a second power level when it is detected that the charging apparatus is connected to a device to be charged, where the first voltage level set is used to indicate a comparison result of a first data voltage value and a target preset value, and the second voltage level set is used to indicate a comparison result of a second data voltage value and the foregoing target preset value; and charging the device to be charged with a target power according to the first voltage level set and the second voltage level set.

DETAILED DESCRIPTION OF EMBODIMENTS

Some terms/nouns used in the embodiments of the present disclosure are described first.
1. BC1.2 Specification
The Specification BC1.2 specifies the standard downstream port (SDP), a charging downstream port (CDP), and a dedicated charging port (DCP). The SDP port is defined by the specification of USB 2.0 & USB 3.0; if it is an SDP port for USB2.0, the charging current is 500 mA; if it is an SDP port for USB3.0, the charging current is 900 mA. The CDP port supports both charging and data transmission, and the maximum charging current can be up to 1 A. The DCP port supports a charging current greater than 1.5 A. The DCP port is configured to charge short-circuited positive data pin D+ and negative data pin D−, and cannot transmit data.

The following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure shall fall within the protection scope of the present disclosure.

It should be noted that "/" in this specification represents or. For example, AB may indicate A or B; "and/or" in this specification merely describes an association relationship between associated objects, and indicates that there may be three relationships. For example, A and/or B may indicate three cases: only A exists, both A and B exist, and only B exists. The term "a plurality of" refers to two or more.

In the specification and claims of the present disclosure, the terms such as "first" and "second" are used for distinguishing different objects, but are not used for describing a specific sequence of the objects. For example, a first comparison module, a second comparison module and the like are used to distinguish different comparison modules, rather than to describe a specific order of the comparison modules.

It should be noted that in this embodiment of the present disclosure, the term such as "exemplary" or "for example" is used for representing an example, an illustration, or a description. Any embodiment or design solution described as "exemplary" or "for example" in this embodiment of the present disclosure should not be explained as being more preferred or having more advantages than another embodiment or design solution. Exactly, the use of the term such as "exemplary" or "for example" is intended to present a related concept in a specific manner.

It should be noted that a charging apparatus in the embodiments of the present disclosure may be a charging plug, a mobile charging power supply, a computer host with a USB port, a mobile phone with a charging function, or the like, which is not specifically limited in the embodiments of the present disclosure.

A device to be charged in the embodiments of the present disclosure may be any electronic device that needs to be charged, such as a mobile terminal, a mobile power supply, an electronic toy, or the like, which is not specifically limited in the embodiments of the present disclosure.

The device to be charged in the embodiments of the present disclosure may be a terminal device with an operating system. The operating system may be an Android operating system, or may be an iOS operating system, or may be another possible operating system, which is not specifically limited in this embodiment of the present disclosure.

An embodiment of the present disclosure provides a charging apparatus, the charging apparatus including: a first comparison module, a second comparison module, a control module connected to the first comparison module and the second comparison module, and a charging module connected to the control module; the first comparison module configured to compare a first data voltage value with a target preset value when it is detected that the charging apparatus is connected to a device to be charged, and output a first voltage level set according to a comparison result; the second comparison module configured to compare a second data voltage value with the foregoing target preset value when it is detected that the charging apparatus is connected to the device to be charged, and output a second voltage level set according to a comparison result; and the control module configured to control the charging module to charge the device to be charged with a target power according to the first voltage level set and the second voltage level set. As when detecting that the charging apparatus is connected to the device to be charged, the charging apparatus can obtain the first voltage level set and the second voltage level set corresponding to the device to be charged according to the first comparison module and the second comparison module, and then determine a target power according to voltage levels in the first voltage level set and voltage levels in the second set, where the target power satisfies an acceptable charging power for the device to be charged. Therefore, in the case that the device to be charged skips performing power detection, the charging module can be controlled, according to the first comparison module and the second comparison module, to charge the device to be charged with the target power determined by the charging apparatus, to avoid charging the device to be charged with too high power. For that reason, the charging apparatus provided by the embodiment of the present disclosure can improve the charging safety.

Figure 1:
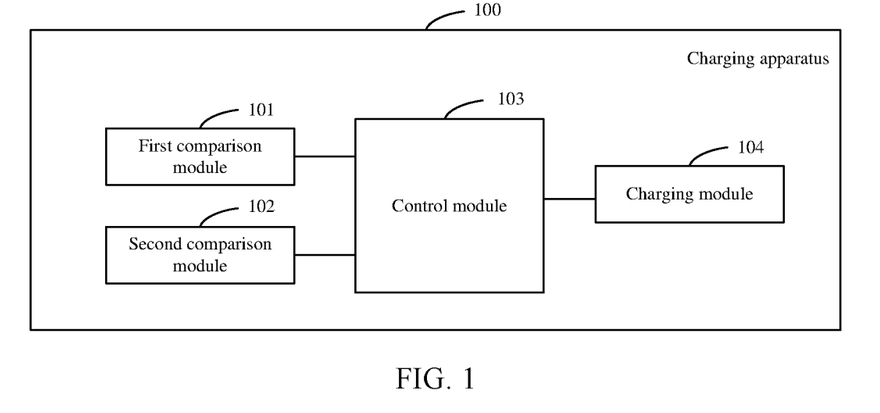
FIG. 1 is a first schematic diagrams of a charging apparatus provided in an embodiment of the present disclosure.

As shown in FIG. 1, it is a schematic diagram of a charging apparatus provided in an embodiment of the present disclosure. The charging apparatus 100 includes: a first comparison module 101, a second comparison module 102, a control module 103 connected to the first comparison module 101 and the second comparison module 102, and a charging module 104 connected to the control module 103.

The first comparison module 101 is configured to compare a first data voltage value with a target preset value when it is detected that the charging apparatus 100 is connected to a device to be charged, and output a first voltage level set according to a comparison result.

It should be noted that a quantity of first data voltage values that need to be compared with the target preset value is identical to a quantity of voltage levels in the first voltage level set. That is, the first comparison module compares M data voltage values with the target preset value, and the first comparison module outputs M comparison results, where M is a positive integer.

Optionally, the target preset value may be a preset reference voltage value or a reference current value.

It should be noted that the data voltage value may be a voltage or a voltage value converted from a current, a power, or the like, which is not specifically limited in the embodiment of the present disclosure.

The second comparison module 102 is configured to compare the second data voltage value with the target preset value when it is detected that the charging apparatus 100 is connected to the device to be charged, and output a second voltage level set according to a comparison result.

Similarly, a quantity of voltage levels in the second voltage level set is identical to a quantity of the second data voltage values. That is, the second comparison module compares N data voltage values with the target preset value, and the second comparison module outputs N comparison results, where N is a positive integer.

It should be noted that the quantities of data voltage values compared by the first comparison module and the second comparison module may be identical or different, which is not specifically limited in the embodiment of the present disclosure.

The control module 103 is configured to control the charging module 104 to charge the device to be charged with a target power according to the first voltage level set and the second voltage level set.

The control module 103 may be implemented through a central processing unit (CPU). Alternatively, the control module 103 may be implemented through at least one of the following: one or more application specific integrated circuits (ASIC), digital signal processors (DSP), digital signal processing devices (DSPD), programmable logic devices (PLD), field-programmable gate arrays (FPGA), general purpose processors, controllers, microcontrollers, or microprocessors. The charging module 104 may be a battery.

It can be understood that when the charging apparatus is connected to different devices to be charged, level sets for different devices to be charged obtained by the first comparison module and the second comparison module may be different or identical, which is not specifically limited in the embodiment of the present disclosure.

Based on this solution, the charging apparatus can obtain the first voltage level set and the second voltage level set corresponding to the device to be charged according to the first comparison module and the second comparison module when detecting that the charging apparatus is connected to the device to be charged, and then determine a target power according to voltage levels in the first voltage level set and voltage levels in the second set, where the target power satisfies an acceptable charging power for the device to be charged. Therefore, in the case that the device to be charged skips performing power detection, the charging module can be controlled, according to the first comparison module and the second comparison module, to charge the device to be charged with the target power determined by the charging apparatus, to avoid charging the device to be charged with too high power. For that reason, the charging apparatus provided by the embodiment of the present disclosure can improve the charging safety.

Optionally, the first data voltage value is a voltage value of a first data pin, the second data voltage value is a voltage value of a second data pin, and the first data pin and the second data pin are data pins in the charging apparatus. That is, the first comparison module compares the voltage value on the first data pin in the charging apparatus with the target preset value; the second comparison module compares the voltage value on the second data pin in the charging apparatus with the target preset value.

That is, when detecting that the charging apparatus is connected to the device to be charged, the charging apparatus can use the first comparison module in the charging apparatus to compare the voltage value on the first data pin in the charging apparatus with the target preset value, and use the second comparison module to compare the voltage value on the second data pin in the charging apparatus with the target preset value, and determines the target power according to the output voltage levels in the first voltage level set and the voltage levels in the second voltage level set.

Optionally, the first data pin is a positive data pin, and the second data pin is a negative data pin. That is, the first comparison module compares magnitudes of the voltage value on the positive data pin in the charging apparatus and the target preset value; the second comparison module compares magnitudes of the voltage value on the negative data pin in the charging apparatus and the target preset value.

That is, when detecting that the charging apparatus is connected to the device to be charged, the charging apparatus can use the first comparison module in the charging apparatus to compare the voltage value on the positive data pin with the target preset value, and use the second comparison module to compare the voltage value on the negative data pin with the target preset value, and then the charging apparatus determines the target power according to the output first voltage level set and second voltage level set.

Optionally, the first data pin is a negative data pin, and the second data pin is a positive data pin. That is, the first comparison module compares magnitudes of the voltage value on the negative data pin in the charging apparatus and the target preset value; the second comparison module compares magnitudes of the voltage value on the positive data pin in the charging apparatus and the target preset value.

That is, when detecting that the charging apparatus is connected to the device to be charged, the charging apparatus can use the first comparison module in the charging apparatus to compare the voltage value on the negative data pin with the target preset value, and use the second comparison module to compare the voltage value on the positive data pin with the target preset value, and then the charging apparatus determines the target power according to the output first voltage level set and second voltage level set.

Generally, the positive data pin is referred to as a D+ pin, and the negative data pin is referred to as a D− pin. The device to be charged may also include a D+ pin and a D− pin, and a connection line connecting the charging apparatus and the device to be charged may also include a D+ pin and a D− pin.

Optionally, the target power includes a first power and a second power, and the first power is greater than or equal to the second power.

The first power may be a charging power for a higher charging current or a higher charging voltage provided by the charging apparatus, and the second power may be a minimum charging power that the charging apparatus can provide, such as a charging power corresponding to a minimum charging current.

The control module 103 may be configured to control the charging module 104 to charge the device to be charged with the first power in the case that the first voltage level set and the second voltage level set satisfy a first condition.

The first condition is: the voltage levels in the first voltage level set are correspondingly equal to voltage levels in a first preset voltage level set, and the voltage levels in the second voltage level set are correspondingly equal to voltage levels in a second preset voltage level set.

It can be understood that the first voltage level set includes one output voltage level, and the first preset voltage level set includes one preset voltage level. The first voltage level set includes K output voltage levels, and the preset voltage level set includes K preset voltage levels corresponding to the K output voltage levels respectively. For example, A1 corresponds to B1, A2 corresponds to B2, and A3 corresponds to B3. The voltage levels in the first voltage level set are correspondingly equal to the voltage levels in the first preset voltage level set, which means that the K output voltage levels correspond to the K preset voltage levels respectively in a one-to-one correspondence. The first condition may be understood as: A1 and B1 are equal, A2 and B2 are equal, and A3 and B3 are equal.

It should be noted that if the device to be charged performs power detection on the charging apparatus, the first voltage level set and the second voltage level set satisfy the first condition. The charging apparatus may directly charge the device to be charged with a higher first power, or charge the device to be charged according to a first power requested by the device to be charged after power detection is completed.

The control module 103 may be configured to control the charging module 104 to charge the device to be charged with the second power in the case that the first voltage level set and the second voltage level set fail to satisfy the first condition.

For example, it is assumed that a charging current corresponding to the first power is 1 A, and a charging current corresponding to the second power is 300 mA. The charging current of 300 mA may be used for charging if the first condition is not satisfied.

It can be understood that if no power detection is performed on the charging apparatus when the device to be charged is connected to the charging apparatus, or the device to be charged does not support performing power detection on the charging apparatus, or the connection line connecting the charging apparatus and the device to be charged is unqualified (for example, no available first data voltage value, no available second data voltage value), the first voltage level set and the second voltage level set fail to satisfy the first condition. If the charging apparatus can determine to use a lower second power to charge the device to be charged according to the first voltage set and the second voltage set, using the charging apparatus of the embodiment of the present disclosure avoids that a high-power charging apparatus charges a device to be charged that can only be charged with low power with high power, thereby making the charging process safer.

Figure 2:
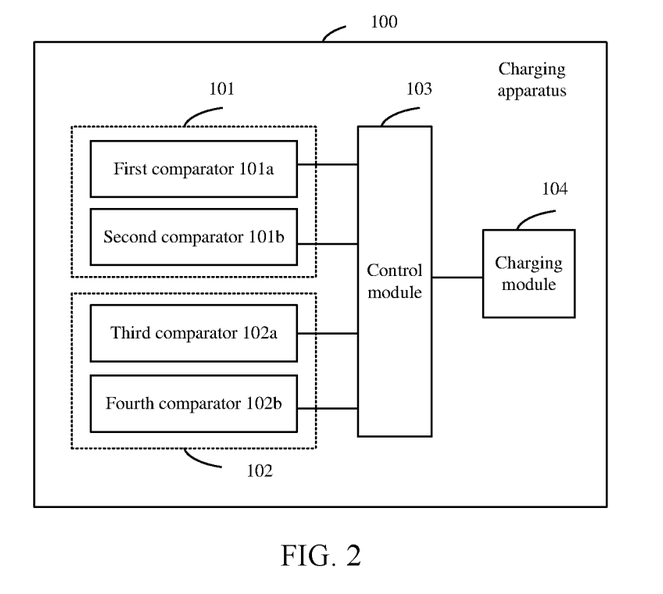
FIG. 2 is a second schematic diagram of a charging apparatus provided in an embodiment of the present disclosure.

Optionally, with reference to FIG. 1, as shown in FIG. 2, the first comparison module 101 includes a first comparator 101a and a second comparator 101b, and the second comparison module 102 includes a third comparator 102a and a fourth comparator 102b, where the first comparator 101a, the second comparator 101b, the third comparator 102a, and the fourth comparator 102b are all connected to the control module 103.

The target preset value includes a first preset value and a second preset value, the first voltage level set includes a first voltage level and a second voltage level, and the second voltage level set includes a third voltage level and a fourth voltage level.

The first comparator 101a is configured to compare the first data voltage value with the first preset value, and output the first voltage level according to a comparison result.

The second comparator 101b is configured to compare the first data voltage value with the second preset value, and output the second voltage level according to a comparison result.

The third comparator 102a is configured to compare the second data voltage value with the first preset value, and output the third voltage level according to a comparison result.

The fourth comparator 102b is configured to compare the second data voltage value with the second preset value, and output the fourth voltage level according to a comparison result.

Optionally, the first preset voltage level set includes a first preset voltage level and a second preset voltage level.

The first preset voltage level is a high voltage level, and the second preset voltage level is a low voltage level. Alternatively, the first preset voltage level is a low voltage level, and the second preset voltage level is a high voltage level.

The second preset voltage level set includes a third preset voltage level and a fourth preset voltage level.

The third preset voltage level is a high voltage level, and the fourth preset voltage level is a low voltage level. Alternatively, the third preset voltage level is a low voltage level, and the fourth preset voltage level is a high voltage level.

Furthermore, the first condition may be that: the first voltage level is equal to the first preset voltage level, the second voltage level is equal to the second preset voltage level, the third voltage level is equal to the third preset voltage level, and the fourth voltage level is equal to the fourth preset voltage level.

Exemplarily, table 1 is an exemplary table of corresponding relationships between the voltage levels in the first voltage level set, the voltage levels in the second voltage level set and the target preset values in the case that the first condition is satisfied.

TABLE 1

| First preset voltage level | Second preset voltage level | Third preset voltage level | Fourth preset voltage level | First voltage level | Second voltage level | Third voltage level | Fourth voltage level |
|---|---|---|---|---|---|---|---|
| High | Low | High | Low | High | Low | High | Low |
| High | Low | Low | High | High | Low | Low | High |
| Low | High | Low | High | Low | High | Low | High |
| Low | High | High | Low | Low | High | High | Low |

Exemplarily, it can be seen with reference to table 1 that if the first preset voltage level is a high voltage level, the second preset voltage level is a low voltage level, the third preset voltage level is a high voltage level, and the fourth preset voltage level is a low voltage level, the first condition is that: the first voltage level is a high voltage level, the second voltage level is a low voltage level, the third voltage level is a high voltage level, and the fourth voltage level is a high voltage level. If at least one of the first voltage level, the second voltage level, the third voltage level, or the fourth voltage level is different from the corresponding preset voltage level, the first condition is not satisfied.

With this solution, voltages on different data pins can be compared with target preset values according to the first comparator, the second comparator, the third comparator, and the fourth comparator in the charging apparatus, and an output voltage level of each comparator is determined according to a comparison result, and then it is determined according to the output voltage level of each comparator whether the first condition is satisfied; the device to be charged is charged with a higher first power in the case that the first condition is satisfied, and the device to be charged is charged with a lower second power in the case that the first condition is not satisfied.

Exemplarily, description is made by taking the example that the first comparator, the second comparator, the third comparator, and the fourth comparator are all positive voltage comparators, the first preset value is 0.5 V, and the second preset value is 0.7 V.

Figure 3:
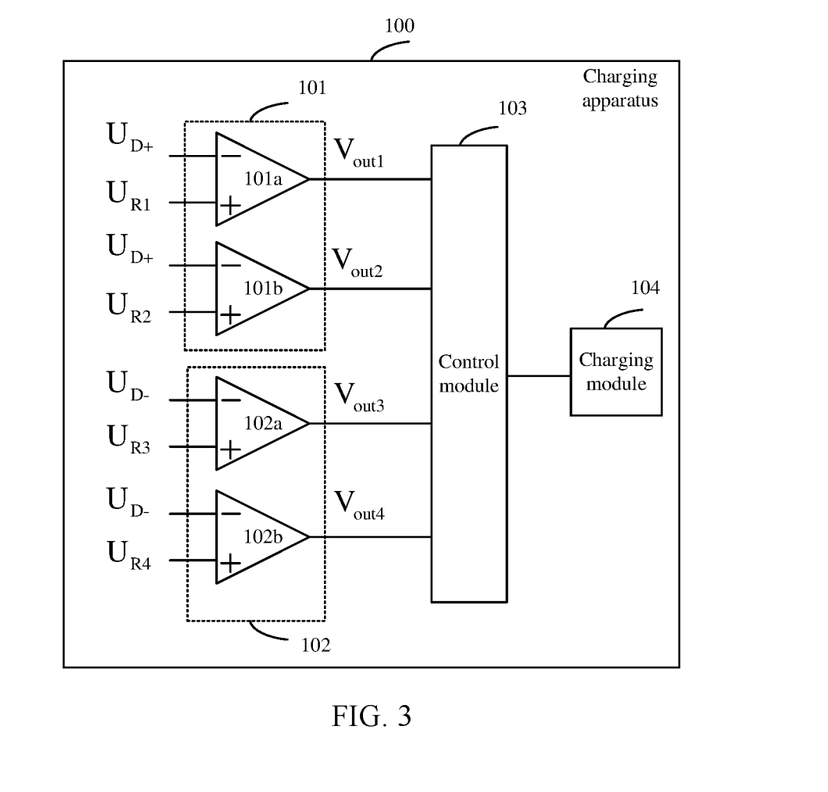
FIG. 3 is a third schematic diagram of a charging apparatus provided in an embodiment of the present disclosure.

Optionally, with reference to FIG. 2, as shown in FIG. 3, the comparator 101a is the first comparator, the comparator 101b is the second comparator, the comparator 102a is the third comparator, and the comparator 102b is the fourth comparator.

The inverting terminal of the comparator 101a is connected to the D+ pin of the charging apparatus, and a non-inverting terminal voltage of the comparator 101a is the first preset value $U_{R1}$ and $U_{R1}$ is equal to 0.5 V.

The inverting terminal of the comparator 101b is connected to the D+ pin of the charging apparatus, and a non-inverting terminal voltage of the comparator 101b is the second preset value $U_{R2}$, and $U_{R2}$ is equal to 0.7 V.

The inverting terminal of the comparator 102a is connected to the D− pin of the charging apparatus, and a non-inverting terminal voltage of the comparator 102a is the first preset value $U_{R3}$, and $U_{R3}$ is equal to 0.5 V.

The inverting terminal of the comparator 102b is connected to the D− pin of the charging apparatus, and a non-inverting terminal voltage of the comparator 102b is the second preset value $U_{R4}$, and $U_{R4}$ is equal to 0.7 V.

Generally, if a positive voltage comparator is used, and if a non-inverting terminal voltage is higher than an inverting terminal voltage, an output of the comparator is a high voltage level; if a non-inverting terminal voltage is lower than an inverting terminal voltage, an output of the comparator is a low voltage level.

That is, the first condition is that: the output of the first comparator is a low voltage level, the output of the second comparator is a high voltage level, the output of the third comparator is a low voltage level, and the output of the fourth comparator is a high voltage level.

It should be noted that the foregoing description only takes the four comparators as identical comparators. In the embodiments of the present disclosure, the four comparators may be all identical comparators, or some of them are identical comparators, or they are completely different comparators, which is not specifically limited in the embodiments of the present disclosure.

Optionally, the comparator may be a positive voltage comparator or a negative voltage comparator.

For example, the type of the comparator may be a single-limit comparator, a hysteresis comparator, a dual-limit comparator. A single-limit comparator is illustrated in FIG. 3 for description.

It should be noted that if the comparison module used by the charging apparatus is a dual-limit comparator, the first comparison module and the second comparison module are each a dual-limit comparator.

For example, the first comparison module is a first dual-limit comparator, and the second comparison module is a second dual-limit comparator. The first dual-limit comparator compares the first data voltage with the first preset value and the second preset value, and the second dual-limit comparator compares the second data voltage with the first preset value and the second preset value.

One input end of the first dual-limit comparator inputs the first data voltage, one input end inputs the first preset value, one input end inputs the second preset value, and the output end outputs a comparison result. One input end of the second dual-limit comparator inputs the second data voltage, one input end inputs the first preset value, one input end inputs the second preset value, and the output end outputs a comparison result.

It should be noted that if the first data voltage is between the first preset value and the second preset value, the first dual-limit comparator outputs a low voltage level, and if the first data voltage is not between the first preset value and the second preset value, the first dual-limit comparator outputs a high voltage level. That is, the first condition is that: the output of the first dual-limit comparator is a low voltage level, and the output voltage level of the second dual-limit comparator is a low voltage level.

It should be noted that the types of comparators used by the first comparison module and the second comparison module may be identical or different, which is not specifically limited in the embodiments of the present disclosure.

Generally, when a charging apparatus is connected to a device to be charged, if the device to be charged performs power detection on the charging apparatus according to the BC1.2 Specification, a D+ pin of the charging apparatus is connected to a D+ pin of the device to be charged, and a D− pin of the charging apparatus is connected to a D− pin of the device to be charged, so that the D+ pin and the D− pin of the charging apparatus are short-circuited, and levels of the D+ pin and the D− pin of the charging apparatus are both between 0.5 V and 0.7 V. If the device to be charged skips performing power detection, at least one of the levels of the D+ pin or the D− pin of the charging apparatus is not between 0.5 V and 0.7 V.

Example 1

Assuming that the first preset value is 0.5 V and the second preset value is 0.7 V, if voltages of the D+ pin and the D− pin are 0.6 V, it can be determined with reference to the charging apparatus 100 of FIG. 3 that:

An inverting terminal voltage $U_{D+}$ of the comparator 101a is equal to 0.6 V, a non-inverting terminal voltage $U_{R1}$ of the comparator 101a is equal to 0.5 V, and $V_{out1}$ output according to a comparison result is a low voltage level.

An inverting terminal voltage $U_{D+}$ of the comparator 101b is equal to 0.6 V, a non-inverting terminal voltage $U_{R2}$ of the comparator 101b is equal to 0.7 V, and $V_{out2}$ output according to a comparison result is a high voltage level.

An inverting terminal voltage $U_{D-}$ of the comparator 102a is equal to 0.6 V, a non-inverting terminal voltage $U_{R3}$ of the comparator 102a is equal to 0.7 V, and $V_{out3}$ output according to a comparison result is a low voltage level.

An inverting terminal voltage $U_{D-}$ of the comparator 102b is equal to 0.6 V, a non-inverting terminal voltage $U_{R4}$ of the comparator 102b is equal to 0.7 V, and $V_{out4}$ output according to a comparison result is a high voltage level.

That is, in this example, the first condition is that: an output of the comparator 101a is a low voltage level, an output of the comparator 101b is a high voltage level, an output of the comparator 102a is a low voltage level, and an output of the comparator 102b is a high voltage level. If the output of any one of the comparator 101a, the comparator 101b, the comparator 102a, and the comparator 102b is different from the foregoing one, the first condition is not satisfied.

It should be noted that in this example, if $U_{D+}$ and $U_{D-}$ are both 0.5 V, the output of the comparator is specified as a low voltage level, and if $U_{D+}$ and $U_{D-}$ are both 0.7 V, the output of the comparator is specified as a high voltage level.

Example 2

Assuming that the first preset value is 0.7 V and the second preset value is 0.5 V, if the voltages of D+ and D− are 0.6 V, it can be determined with reference to the charging apparatus 100 of FIG. 3 that:

An inverting terminal voltage $U_{D+}$ of the comparator 101a is equal to 0.6 V, a non-inverting terminal voltage $U_{R1}$ of the comparator 101a is equal to 0.7 V, and $V_{out1}$ output according to a comparison result is a high voltage level.

An inverting terminal voltage $U_{D+}$ of the comparator 101b is equal to 0.6 V, a non-inverting terminal voltage $U_{R2}$ of the comparator 101b is equal to 0.5 V, and $V_{out2}$ output according to a comparison result is a low voltage level.

An inverting terminal voltage UD− of the comparator 102a is equal to 0.6 V, a non-inverting terminal voltage UR3 of the comparator 102a is equal to 0.7 V, and Vout3 output according to a comparison result is a high voltage level.

An inverting terminal voltage UD− of the comparator 102b is equal to 0.6 V, a non-inverting terminal voltage UR4 of the comparator 102b is equal to 0.5 V, and Vout4 output according to a comparison result is a low voltage level.

That is, in this example, the first condition is that: the output of the comparator 101a is a high voltage level, the output of the comparator 101b is a low voltage level, the output of the comparator 102a is a high voltage level, and the output of the comparator 102b is a low voltage level. If the output of any one of the comparator 101a, the comparator 101b, the comparator 102a, and the comparator 102b is different from the foregoing one, the first condition is not satisfied.

It should be noted that if the charging apparatus provided in the embodiment of the present disclosure detects that there is no voltage at the inverting terminal of the comparator, it can be considered that the input of the inverting terminal of the comparator is 0. In the case that a charging cable is a charging cable of poor quality, and no data pin may be available, the charging apparatus may use a low power for charging or stop output in this case.

Figure 4A:
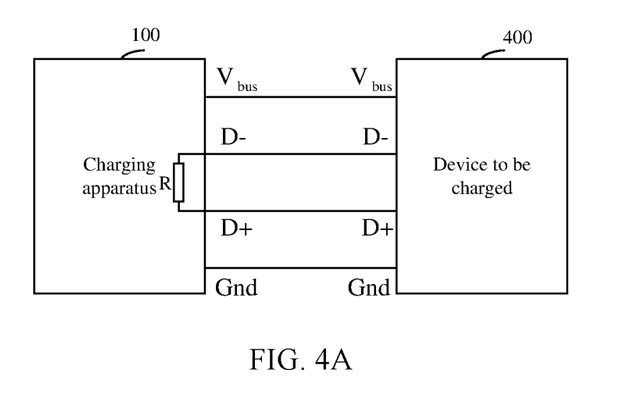
FIG. 4A is a first schematic diagram of a charging system provided in an embodiment of the disclosure.
Figure 4B:
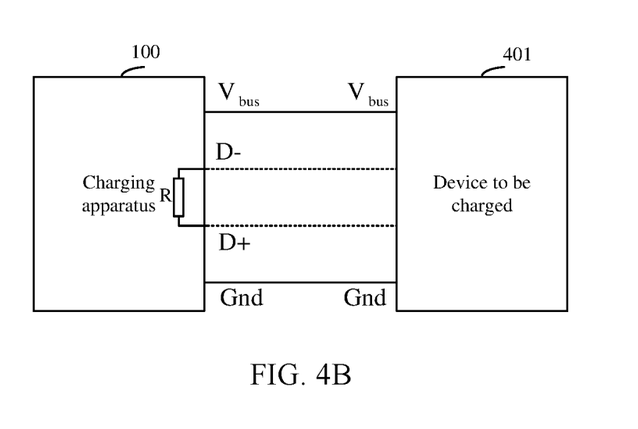
FIG. 4B is a second schematic diagram of a charging system provided in an embodiment of the disclosure.

For easy understanding of the charging method of the present disclosure, a charging system used in the charging method of the embodiment of the present disclosure is provided below. FIGS. 4A and 4B show a charging system provided by embodiments of the present disclosure. The charging system includes a charging apparatus 100 and a device to be charged 400 or a device to be charged 401 connected to the charging apparatus 100. As shown in FIG. 4A, a Vbus pin, a D− pin, a D+ pin, and a Gnd pin of the charging apparatus 100 are respectively connected to a Vbus pin, a D− pin, a D+ pin, and a Gnd pin of the device to be charged 400, the D− pin and the D+ pin of the charging apparatus are short-circuited, and a pull-down resistor R for communication is connected between the D− pin and the D+ pin of the charging apparatus. As shown in FIG. 4B, the Vbus pin and the Gnd pin of the charging apparatus 100 are respectively connected to the Vbus pin and the Gnd pin of the device to be charged 401, where the D− pin of the charging apparatus is left floating, and the D+ pin is left floating.

The charging method according to the embodiment of the present disclosure will be described below with reference to the charging system in FIGS. 4A and 4B, and the charging method is applied to any of the foregoing charging apparatuses.

Figure 5:
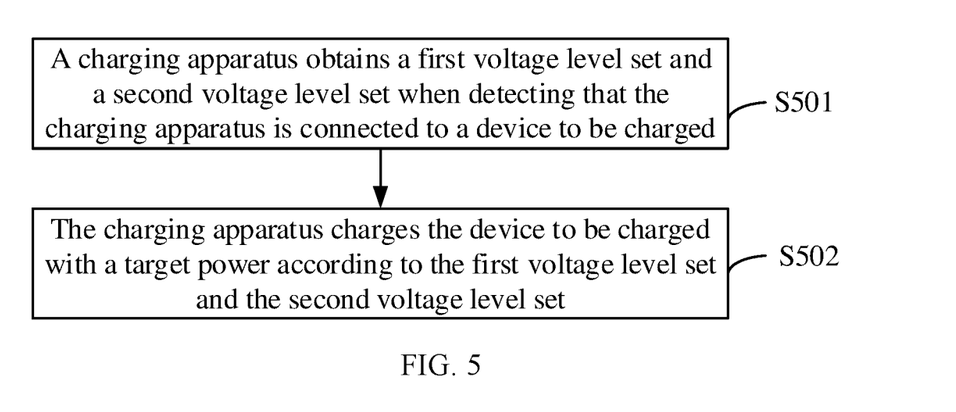
FIG. 5 is a schematic flowchart of a charging method provided in an embodiment of the disclosure.

FIG. 5 is a schematic flowchart of a charging method provided by an embodiment of the disclosure. As shown in FIG. 5, the charging method includes S501 and S502:

A S501: charging apparatus obtains a first voltage level set and a second voltage level set when detecting that the charging apparatus is connected to a device to be charged.

The first voltage level set is used to indicate a result of comparison of a first data voltage value and a target preset value, and the second voltage level set is used to indicate a result of comparison of a second data voltage value and the target preset value.

It should be noted that for all descriptions of the first voltage level set, the second voltage level set, the first data voltage value, the second data voltage value, and the target preset value, reference may be made to the description in the foregoing embodiment. Details are not described herein again.

S502: The charging apparatus charges the device to be charged with a target power according to the first voltage level set and the second voltage level set.

When the charging apparatus is connected to different devices to be charged, level sets for different devices to be charged obtained by the charging apparatus may be different or identical, which is not specifically limited in the embodiment of the present disclosure.

Based on this solution, the charging apparatus can obtain the first voltage level set and the second voltage level set when detecting that the charging apparatus is connected to the device to be charged, and then determine a target power according to voltage levels in the first voltage level set and voltage levels in the second set, where the target power satisfies an acceptable charging power for the device to be charged. Therefore, in the case that the device to be charged skips performing power detection, the device to be charged can be charged according to the target power determined by the charging apparatus, to avoid charging the device to be charged with too high power. For that reason, the charging apparatus provided by the embodiment of the present disclosure can improve the charging safety.

Optionally, the target power includes a first power and a second power, and the first power is greater than or equal to the second power.

Furthermore, the foregoing S502 may be performed by using S502*a* or S502*b*.

S502*a*: the charging apparatus charges the device to be charged with a first power in the case that the first voltage level set and the second voltage level set satisfy a first condition.

S502*b*: the charging apparatus charges the device to be charged with a second power in the case that the first voltage level set and the second voltage level set fail to satisfy the first condition.

The first condition is: the voltage levels in the first voltage level set are correspondingly equal to voltage levels in a first preset voltage level set, and the voltage levels in the second voltage level set are correspondingly equal to voltage levels in a second preset voltage level set.

Based on this solution, when the charging apparatus detects that the charging apparatus is connected to the device to be charged, if the first voltage level set and the second voltage level set satisfy the first condition, the charging apparatus may directly charge the device to be charged with a higher first power, or charge the device to be charged according to a first power requested by the device to be charged after power detection is completed. If the first voltage level set and the second voltage level set fail to satisfy the first condition, the charging apparatus of the embodiment of the present disclosure may be used, and it is determined to charge the device to be charged with a lower second power according to the first voltage set and the second voltage set, thereby avoiding that a high-power charging apparatus charges a device to be charged that can only be charged with low power with high power, and making the charging process safer.

Optionally, the first preset voltage level set includes a first preset voltage level and a second preset voltage level; where the first preset voltage level is a high voltage level and the second preset voltage level is a low voltage level, or the first preset voltage level is a low voltage level, and the second preset voltage level is a high voltage level.

Optionally, the second preset voltage level set includes a third preset voltage level and a fourth preset voltage level; where the third preset voltage level is a low voltage level and the fourth preset voltage level is a high voltage level.

Furthermore, the first condition may be that: the first voltage level is equal to the first preset voltage level, the second voltage level is equal to the second preset voltage level, the third voltage level is equal to the third preset voltage level, and the fourth voltage level is equal to the fourth preset voltage level.

It should be noted that for the first condition, reference may be made to the description in the foregoing embodiment. Details are not described herein again.

It can be understood that different preset voltage levels are used, so that level value combinations satisfying the first condition can be more diverse.

It should be noted that in this specification, the terms "comprise", "include", and any other variants thereof are intended to cover non-exclusive inclusion, so that a process, a method, an article, or an apparatus that includes a series of elements not only includes these elements, but also includes other elements not expressly listed, or further includes elements inherent to this process, method, article, or apparatus. In the absence of more restrictions, an element defined by the statement "including a . . ." does not exclude another same element in a process, method, article, or device that includes the element.

According to the foregoing descriptions of the implementations, a person skilled in the art may clearly understand that the foregoing method in the embodiment may be implemented by using software plus a required universal hardware platform, or certainly may be implemented by using hardware. However, in many cases, the former is a better implementation. Based on such an understanding, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing a terminal device (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A charging apparatus, comprising: a first comparison module, a second comparison module, a control module connected to the first comparison module and the second comparison module, and a charging module connected to the control module; wherein
the first comparison module is configured to compare a first data voltage value with a target preset value when it is detected that the charging apparatus is connected to a device to be charged, and output a first voltage level set according to a comparison result;
the second comparison module is configured to compare a second data voltage value with the target preset value when it is detected that the charging apparatus is connected to the device to be charged, and output a second voltage level set according to a comparison result; and
the control module is configured to control the charging module to charge the device to be charged with a target power according to the first voltage level set and the second voltage level set; wherein
the first comparison module comprises a first comparator and a second comparator, and the second comparison module comprises a third comparator and a fourth comparator, the first comparator, the second comparator, the third comparator, and the fourth comparator are all connected to the control module; the target preset value comprises a first preset value and a second preset value, the first voltage level set comprises a first voltage level and a second voltage level, and the second voltage level set comprises a third voltage level and a fourth voltage level; wherein
the first comparator is configured to compare the first data voltage value with the first preset value, and output the first voltage level according to a comparison result;
the second comparator is configured to compare the first data voltage value with the second preset value, and output the second voltage level according to a comparison result;
the third comparator is configured to compare the second data voltage value with the first preset value, and output the third voltage level according to a comparison result; and
the fourth comparator is configured to compare the second data voltage value with the second preset value, and output the fourth voltage level according to a comparison result.

2. The charging apparatus according to claim 1, wherein the target power comprises a first power and a second power, and the first power is greater than or equal to the second power;
the control module is configured to control the charging module to charge the device to be charged with the first power in a case that the first voltage level set and the second voltage level set satisfy a first condition; or control the charging module to charge the device to be charged with the second power in a case that the first voltage level set and the second voltage level set fail to satisfy the first condition; wherein
the first condition is that voltage levels in the first voltage level set are correspondingly equal to voltage levels in a first preset voltage level set, and voltage levels in the second voltage level set are correspondingly equal to voltage levels in a second preset voltage level set.

3. The charging apparatus according to claim 2, wherein the first data voltage value is a voltage value of a first data pin, the second data voltage value is a voltage value of a second data pin, and the first data pin and the second data pin are data pins in the charging apparatus.

4. The charging apparatus according to claim 2, wherein the first preset voltage level set comprises a first preset voltage level and a second preset voltage level; wherein the first preset voltage level is a high voltage level, and the second preset voltage level is a low voltage level, or the first preset voltage level is a low voltage level, and the second preset voltage level is a high voltage level;
the second preset voltage level set comprises a third preset voltage level and a fourth preset voltage level; wherein the third preset voltage level is a high voltage level, and the fourth preset voltage level is a low voltage level, or the third preset voltage level is a low voltage level, and the fourth preset voltage level is a high voltage level.

5. The charging apparatus according to claim 1, wherein the first data voltage value is a voltage value of a first data pin, the second data voltage value is a voltage value of a second data pin, and the first data pin and the second data pin are data pins in the charging apparatus.

6. The charging apparatus according to claim 5, wherein the first data pin is a positive data pin, and the second data pin is a negative data pin; or the first data pin is a negative data pin, and the second data pin is a positive data pin.

7. A charging method, applied to the charging apparatus according to claim 1, the method comprising:
obtaining the first voltage level set and the second voltage level set when it is detected that the charging apparatus is connected to the device to be charged, wherein the first voltage level set is used to indicate the comparison result of the first data voltage value and the target preset value, and the second voltage level set is used to indicate the comparison result of the second data voltage value and the target preset value;
charging the device to be charged with the target power according to the first voltage level set and the second voltage level set.

8. The method according to claim 7, wherein the target power comprises a first power and a second power, and the first power is greater than or equal to the second power;

the charging the device to be charged with a target power according to the first voltage level set and the second voltage level set comprises:

charging the device to be charged with the first power in a case that the first voltage level set and the second voltage level set satisfy a first condition; or, charging the device to be charged with the second power in a case that the first voltage level set and the second voltage level set fail to satisfy the first condition;

wherein the first condition is that: voltage levels in the first voltage level set are correspondingly equal to voltage levels in a first preset voltage level set, and voltage levels in the second voltage level set are correspondingly equal to voltage levels in a second preset voltage level set.

9. The method according to claim 8, wherein the first preset voltage level set comprises a first preset voltage level and a second preset voltage level; wherein the first preset voltage level is a high voltage level, and the second preset voltage level is a low voltage level, or the first preset voltage level is a low voltage level, and the second preset voltage level is a high voltage level;

the second preset voltage level set comprises a third preset voltage level and a fourth preset voltage level; wherein the third preset voltage level is a high voltage level, and the fourth preset voltage level is a low voltage level, or the third preset voltage level is a low voltage level, and the fourth preset voltage level is a high voltage level.

* * * * *